US012514439B2

(12) United States Patent
Saito et al.

(10) Patent No.: US 12,514,439 B2
(45) Date of Patent: Jan. 6, 2026

(54) ENDOSCOPE SYSTEM FOR CALCULATING OXYGEN SATURATION BASED ON CORRECTION PARAMETERS AND METHOD OF OPERATING THE SAME

(71) Applicant: FUJIFILM Corporation, Tokyo (JP)

(72) Inventors: Takaaki Saito, Ashigarakami-gun (JP); Norimasa Shigeta, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 833 days.

(21) Appl. No.: 17/711,424

(22) Filed: Apr. 1, 2022

(65) Prior Publication Data

US 2022/0218190 A1     Jul. 14, 2022

Related U.S. Application Data

(63) Continuation of application No. PCT/JP2020/036987, filed on Sep. 29, 2020.

(30) Foreign Application Priority Data

Oct. 4, 2019    (JP) .................................. 2019-183849

(51) Int. Cl.
*A61B 1/05*     (2006.01)
*A61B 1/00*     (2006.01)
*A61B 1/06*     (2006.01)

(52) U.S. Cl.
CPC ............ *A61B 1/05* (2013.01); *A61B 1/00009* (2013.01); *A61B 1/00013* (2013.01);
(Continued)

(58) Field of Classification Search
CPC ..... A61B 1/05; A61B 1/00009; A61B 1/0002; A61B 1/0638; A61B 1/0684;
(Continued)

(56) References Cited

U.S. PATENT DOCUMENTS 4,867,557 A * 9/1989 Takatani ............ G01N 21/3151
600/323
5,267,562 A * 12/1993 Ukawa ............... A61B 5/14551
600/323
(Continued)

FOREIGN PATENT DOCUMENTS

JP    2012-213612 A    11/2012
JP    2014-76375 A     5/2014
(Continued)

OTHER PUBLICATIONS

International Preliminary Report on Patentability and Written Opinion of the International Searching Authority for International Application No. PCT/JP2020/036987, dated Apr. 14, 2022, with an English translation.

(Continued)

*Primary Examiner* — Anh Tuan T Nguyen
*Assistant Examiner* — Shankar Raj Ghimire
(74) *Attorney, Agent, or Firm* — Birch, Stewart, Kolasch & Birch, LLP

(57) ABSTRACT

An endoscope obtains a plurality of spectral images from the image pickup of an object to be observed illuminated on the basis of illumination light. A special processing section calculates oxygen saturation of the object to be observed on the basis of the plurality of spectral images, first correction parameters that are used to correct differences in the spectral characteristics of the respective semiconductor light sources, and white balance correction data.

10 Claims, 8 Drawing Sheets

(52) U.S. Cl.
CPC ........ *A61B 1/0002* (2013.01); *A61B 1/00045* (2013.01); *A61B 1/00096* (2013.01); *A61B 1/0638* (2013.01); *A61B 1/0676* (2013.01); *A61B 1/0684* (2013.01)

(58) Field of Classification Search
CPC .......... A61B 1/000094; A61B 1/00057; A61B 1/044; A61B 1/0655; A61B 1/043
See application file for complete search history.

(56) References Cited

U.S. PATENT DOCUMENTS

| | | | |
|---|---|---|---|
| 6,711,425 B1* | 3/2004 | Reuss | A61B 5/14542 600/338 |
| 9,526,408 B2* | 12/2016 | Yamaguchi | A61B 1/0655 |
| 2002/0035330 A1* | 3/2002 | Cline | A61B 1/045 600/478 |
| 2012/0253122 A1* | 10/2012 | Minetoma | A61B 1/000094 600/109 |
| 2013/0033616 A1* | 2/2013 | Kaizu | H04N 25/583 348/222.1 |
| 2013/0041218 A1* | 2/2013 | Lida | A61B 5/7257 600/109 |
| 2013/0211217 A1* | 8/2013 | Yamaguchi | A61B 5/7278 600/327 |
| 2014/0152790 A1* | 6/2014 | Saito | A61B 5/1459 348/68 |
| 2015/0087903 A1 | 3/2015 | Kuramoto | |
| 2015/0216460 A1* | 8/2015 | Shigeta | A61B 1/00045 600/339 |
| 2015/0366492 A1* | 12/2015 | De Haan | A61B 5/7214 600/323 |
| 2016/0183774 A1* | 6/2016 | Shiraishi | A61B 1/3137 600/328 |
| 2016/0287061 A1* | 10/2016 | Shigeta | A61B 1/0005 |
| 2017/0085851 A1* | 3/2017 | Honda | A61B 1/045 |
| 2017/0098301 A1* | 4/2017 | Ikemoto | G06T 7/0012 |
| 2017/0311779 A1* | 11/2017 | Nakajima | A61B 1/00006 |
| 2018/0228347 A1* | 8/2018 | Yamamoto | A61B 1/00057 |
| 2018/0271412 A1* | 9/2018 | Shigeta | A61B 5/14552 |
| 2019/0008362 A1 | 1/2019 | Kamon | |
| 2019/0068864 A1* | 2/2019 | Ohashi | A61B 1/044 |
| 2019/0335978 A1 | 11/2019 | Chiba | |
| 2020/0120320 A1 | 4/2020 | Kubo | |
| 2022/0218190 A1* | 7/2022 | Saito | A61B 1/00096 |

FOREIGN PATENT DOCUMENTS

| | | |
|---|---|---|
| JP | 2015-81569 A | 4/2015 |
| JP | 2017-164021 A | 9/2017 |
| JP | 2019-41946 A | 3/2019 |
| JP | 2019-41947 A | 3/2019 |
| JP | 2019-136412 A | 8/2019 |
| WO | WO 2015/194422 A1 | 12/2015 |
| WO | WO 2018/131631 A1 | 7/2018 |
| WO | WO 2018/230418 A1 | 12/2018 |

OTHER PUBLICATIONS

International Search Report for International Application No. PCT/JP2020/036987, dated Dec. 22, 2020, with an English translation.
Japanese Notice of Reasons for Refusal for Japanese Application No. 2021-551331, dated Jan. 17, 2023, with an English translation.

* cited by examiner

ENDOSCOPE SYSTEM FOR CALCULATING OXYGEN SATURATION BASED ON CORRECTION PARAMETERS AND METHOD OF OPERATING THE SAME

CROSS-REFERENCE TO RELATED APPLICATIONS

This application is a Continuation of PCT International Application No. PCT/JP2020/036987 filed on 29 Sep. 2020, which claims priority under 35 U.S.C § 119(a) to Japanese Patent Application No. 2019-183849 filed on 4 Oct. 2019. The above application is hereby expressly incorporated by reference, in its entirety, into the present application.

BACKGROUND OF THE INVENTION

1. Field of the Invention

The present invention relates to an endoscope system that obtains the oxygen saturation of an object to be observed and a method of operating the endoscope system.

2. Description of the Related Art

An endoscope system, which picks up the image of an object to be observed in a living body, is widely used in a medical field. Since a correlation between oxygen saturation and a lesion area has been known, a diagnosis using oxygen saturation has also been made in recent years. In the diagnosis using oxygen saturation, the oxygen saturation of the object to be observed is calculated on the basis of a plurality of spectral images, which are obtained in a case where an affected area is irradiated with illumination light for oxygen saturation observation of which the light absorption coefficient is changed depending on oxygen saturation, and an oxygen saturation image in which the oxygen saturation is shown as an image is displayed on a monitor.

In a case where oxygen saturation is calculated, signal ratios between different spectral images are used as calculation values obtained from calculation processing based on the plurality of spectral images. Since the slight variation of the signal ratio to be input becomes the noise of oxygen saturation to be output, not only the amount of light emitted from a light source unit, which emits illumination light for oxygen saturation observation, needs to be strictly controlled in terms of hardware but also a technique for correcting the individual difference of an endoscope or the light source unit is also important. For example, in JP2014-76375A, pre-image pickup is performed before main image pickup for calculating oxygen saturation and oxygen saturation is accurately calculated using a correction amount obtained in the pre-image pickup.

SUMMARY OF THE INVENTION

With regard to the signal ratio used for the calculation of oxygen saturation, a difference in signal ratio may occur even though the image of the same object to be observed is picked up since the spectral characteristics of light source units, which emit illumination light for oxygen saturation observation, individually vary. Further, a difference may occur in the signal ratio obtained from the same object to be observed due to a combination of a light source device that includes a light source unit and an endoscope that picks up the image of an object to be observed. In contrast, it is conceivable that white balance correction processing (for example, WO2015/194422A (corresponding to US2017/085851A1)) is performed to correct a difference in signal ratio. However, white balance correction processing is to correct a white portion so that an individual difference is removed, and not only a white portion but also other color portions are used in the calculation of oxygen saturation. For this reason, it is difficult to sufficiently correct a difference in signal ratio, which is caused by an individual difference, by only white balance correction processing.

An object of the present invention is to provide an endoscope system that can accurately calculate oxygen saturation regardless of an individual difference of a light source unit, which emits illumination light for oxygen saturation observation, or the like and a method of operating the endoscope system.

An endoscope system according to an aspect of the present invention comprises: a plurality of semiconductor light sources that emit illumination light having a plurality of wavelength ranges; an endoscope that obtains a plurality of spectral images from image pickup of an object to be observed illuminated on the basis of the illumination light; a first correction parameter storage memory that stores first correction parameters to be used to correct differences in spectral characteristics of the respective semiconductor light sources; a white balance correction data storage memory that stores white balance correction data; and an image control processor that calculates oxygen saturation of the object to be observed on the basis of the plurality of spectral images, the first correction parameters, and the white balance correction data.

It is preferable that the image control processor acquires specific spectral images subjected to white balance correction by performing white balance correction processing, which is based on white balance correction data, on specific spectral images, which are required for calculation of the oxygen saturation, among the spectral images, calculates calculation values for calculation of the oxygen saturation on the basis of the specific spectral images subjected to the white balance correction, calculates correction amounts, which are used to correct the calculation values, by calculation processing based on the calculation values and the first correction parameters, and calculates the oxygen saturation on the basis of corrected calculation values that are obtained from correction of the calculation values using the correction amounts.

It is preferable that the image control processor acquires second correction parameters, which are used to correct differences in the calculation values caused by combinations of the semiconductor light sources and the endoscope and calculates the correction amounts on the basis of the second correction parameters in addition to the calculation values and the first correction parameters in a case where the correction amounts are to be calculated. It is preferable that the semiconductor light source emits specific illumination light to be used to acquire the second correction parameters. It is preferable that the specific illumination light is green light.

It is preferable that the endoscope system comprises a light source processor that acquires third correction parameters to be used to correct differences in the specific spectral images based on changes in wavelength characteristics of the illumination light caused by changes in amounts of light of the semiconductor light sources, and the image control processor calculates the correction amounts on the basis of the third correction parameters in addition to the calculation values and the first correction parameters. It is preferable that each of the first correction parameters is obtained on the basis of a difference value between a peak wavelength of each semiconductor light source and a peak wavelength of a reference light source.

It is preferable that the plurality of semiconductor light sources include a BS light source that emits first blue light of which a central wavelength includes a wavelength of 450 nm, a BL light source that emits second blue light of which a central wavelength includes a wavelength of 470 nm, a green light source that emits green light, and a red light source that emits red light. It is preferable that the plurality of spectral images include a B1 image that corresponds to first blue light of which a central wavelength includes a wavelength of 450 nm, a B2 image that corresponds to second blue light of which a central wavelength includes a wavelength of 470 nm, a G1 image that corresponds to green light, and an R1 image that corresponds to red light.

According to another aspect of the present invention, there is provided a method of operating an endoscope system that includes a plurality of semiconductor light sources emitting illumination light having a plurality of wavelength ranges. The method comprises: a step of causing an endoscope to obtain a plurality of spectral images from image pickup of an object to be observed illuminated on the basis of the illumination light; and a step of causing a processor to calculate oxygen saturation of the object to be observed on the basis of the plurality of spectral images, first correction parameters to be used to correct differences in spectral characteristics of the respective semiconductor light sources, and white balance correction data.

According to the present invention, it is possible to accurately calculate oxygen saturation regardless of an individual difference of a light source unit, which emits illumination light for oxygen saturation observation, or the like.

DESCRIPTION OF THE PREFERRED EMBODIMENTS

First Embodiment

Figure 1:
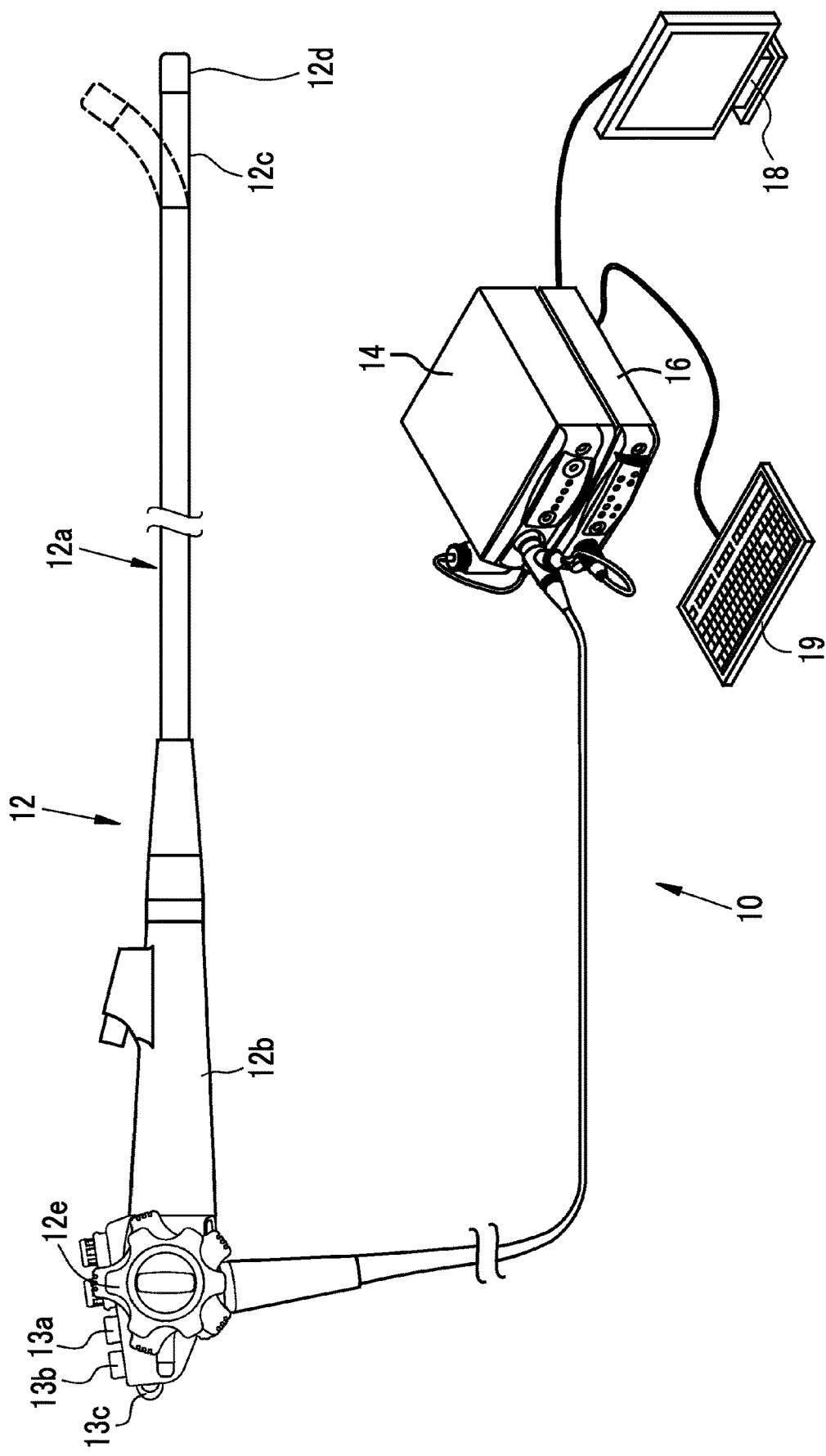
FIG. 1 is a diagram showing the appearance of an endoscope system.

As shown in FIG. 1, an endoscope system 10 according to a first embodiment includes an endoscope 12, a light source device 14, a processor device 16, a monitor 18 serving as a display unit, and a user interface 19. The endoscope 12 is optically connected to the light source device 14 and is electrically connected to the processor device 16. The endoscope 12 includes an insertion part 12a that is to be inserted into an object to be examined, an operation part 12b that is provided at the proximal end portion of the insertion part 12a, and a bendable part 12c and a distal end part 12d that are provided on the distal end side of the insertion part 12a. The bendable part 12c is bent in a case where angle knobs 12e of the operation part 12b are operated. As a result of the bending of the bendable part 12c, the distal end part 12d faces in a desired direction. The distal end part 12d is provided with a jet port (not shown) that jets air, water, and the like toward an object to be observed.

Further, the operation part 12b is provided with a mode changeover switch 13a, a freeze switch 13b, and a zoom operation part 13c in addition to the angle knobs 12e. The mode changeover switch 13a is used for an operation for switching an observation mode. The endoscope system 10 has a normal mode, a special mode, and a calibration mode. The normal mode is an observation mode in which an image having a natural color tone (hereinafter, referred to as a normal image) obtained from the image pickup of the object to be observed using white light as illumination light is displayed on the monitor 18.

The special mode is an oxygen saturation observation mode in which the oxygen saturation of the object to be observed is calculated and displayed. In the oxygen saturation observation mode, the oxygen saturation of the object to be observed is calculated using a plurality of spectral images obtained from the image pickup of the object to be observed and an image in which the value of the calculated oxygen saturation is shown using a pseudo color (hereinafter, referred to as an oxygen saturation image) is generated and displayed on the monitor 18. White balance correction data to be used for white balance correction processing are acquired in the calibration mode.

The freeze switch 13b is a switch that is used to give a static image-acquisition instruction to the processor device 16, and the processor device 16 stores static images according to the static image-acquisition instruction.

The processor device 16 is electrically connected to the monitor 18 and the user interface 19. The monitor 18 outputs and displays the image of each observation mode, image information accessory to the image, and the like. The user interface 19 includes a keyboard and the like, and receives input operations, such as function settings. A mouse and the like may be provided as the user interface 19 in addition to the keyboard. An external recording unit (not shown) in which images, image information, and the like are recorded may be connected to the processor device 16.

Figure 2:
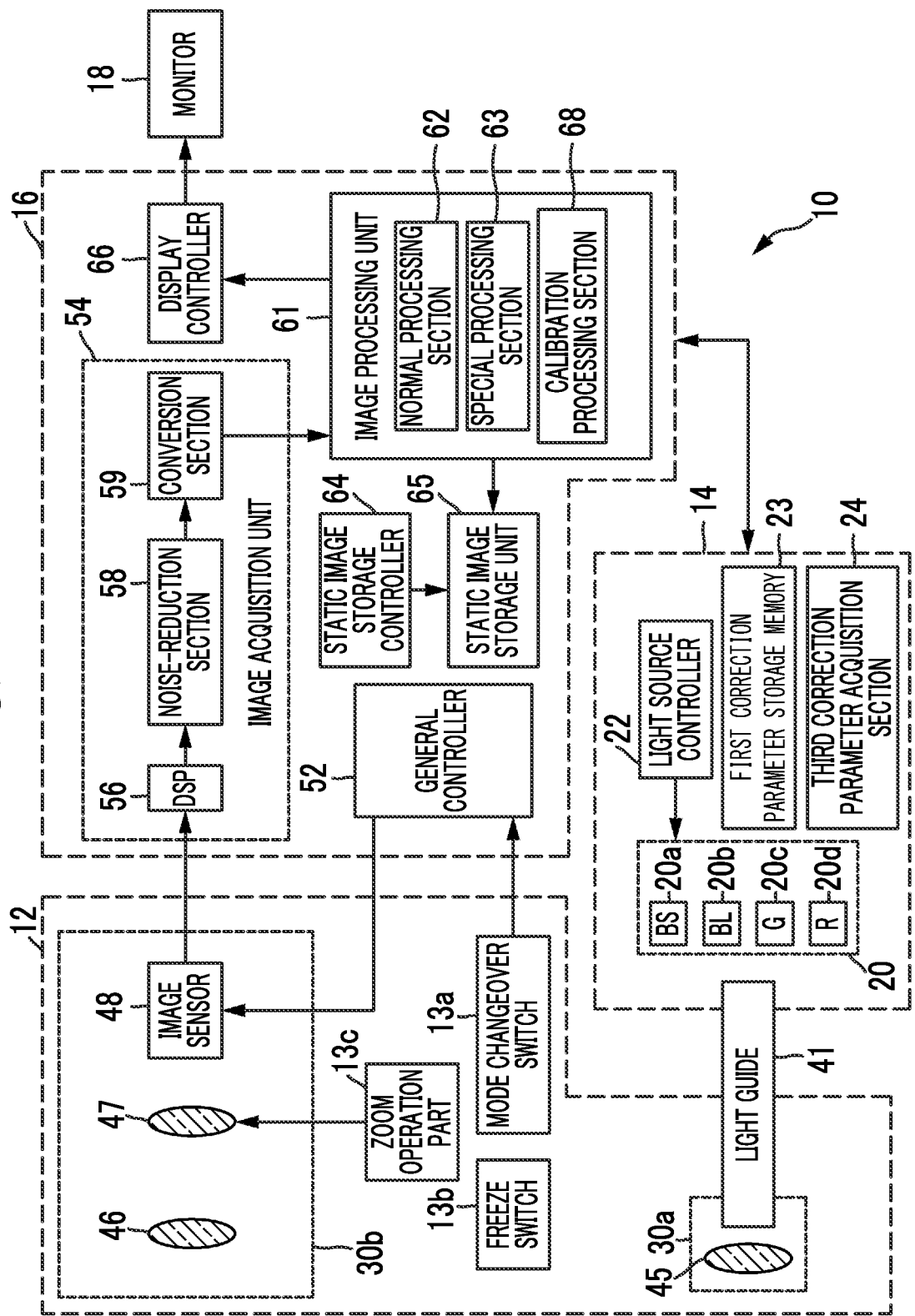
FIG. 2 is a block diagram showing the functions of the endoscope system.

As shown in FIG. 2, the light source device 14 comprises a light source unit 20 that emits illumination light and a light source controller 22 that controls the drive of the light source unit 20.

The light source unit 20 comprises four semiconductor light sources, that is, a BS light source 20a, a BL light source 20b, a G light source 20c, and an R light source 20d. In this embodiment, all of the BS light source 20a, the BL light source 20b, the G light source 20c, and the R light source 20d are light emitting diodes (LEDs). A combination of a laser diode (LD), a phosphor, and a band-limiting filter; a combination of a lamp, such as a xenon lamp, and a band-limiting filter; and the like can be used in the light source unit 20 instead of these LEDs.

Figure 3:
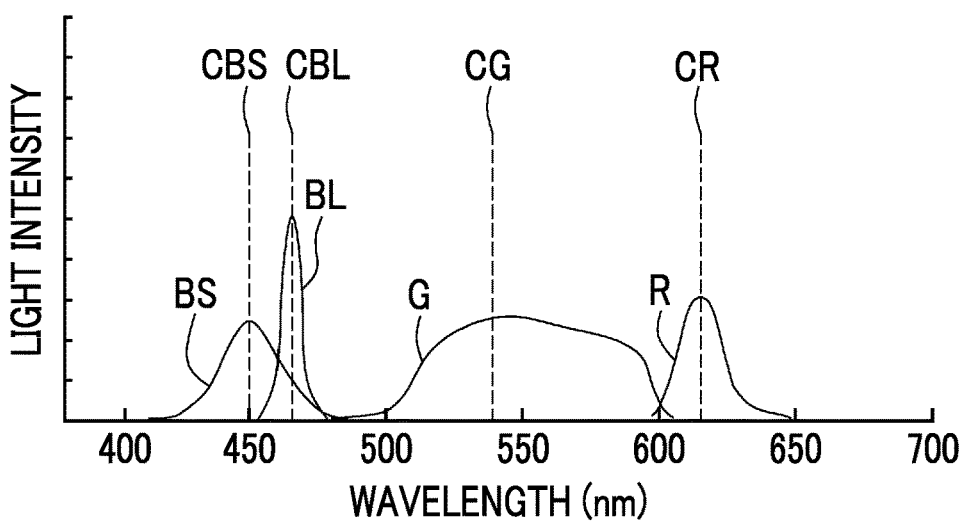
FIG. 3 is a graph showing the emission spectra of first blue light, second blue light, green light, and red light.

As shown in FIG. 3, the BS light source 20a is a blue light source that emits first blue light BS of which the central wavelength (peak wavelength) is in the range of about 450±10 nm and the wavelength range is in the range of about 420 nm to 500 nm. The BL light source 20b is a blue light source that emits so-called blue narrow-band light (hereinafter, referred to as second blue light BL) of which the central wavelength (peak wavelength) and the wavelength range are in the range of about 470±10 nm. The G light source 20c is a green light source that emits green light G of which the central wavelength (peak wavelength) is in the range of about 540±20 nm and the wavelength range is in the range of about 480 nm to 600 nm. The R light source 20d is a red light source that emits red light R of which the central wavelength (peak wavelength) is in the range of about 620±20 nm and the wavelength range is in the range of about 600 nm to 650 nm.

The light source device 14 is provided with a first correction parameter storage memory 23 that stores first correction parameters to be used in the oxygen saturation observation mode. The first correction parameter is a parameter that is used for the calculation of a correction value for a calculation value, and is a parameter that is used to correct an individual difference (variation) in the optical characteristics of each of the BS light source 20a, the BL light source 20b, the G light source 20c, and the R light source 20d. The light sources 20a to 20d vary (have variations) in spectral characteristics, such as a peak wavelength value or a central wavelength.

Specifically, the first correction parameters include a parameter $\Delta1(B450)$ that is obtained on the basis of a difference value between a peak wavelength CBS of first blue light BS of the BS light source 20a and the peak wavelength of a reference light source. In addition, the first correction parameters include a parameter $\Delta1(B470)$ that is obtained on the basis of a difference value between a peak wavelength CBL of second blue light BL of the BL light source 20b and the peak wavelength of the reference light source, a parameter $\Delta1(G)$ that is obtained on the basis of a difference value between a peak wavelength CG of green light G of the G light source 20c and the peak wavelength of the reference light source, and a parameter $\Delta1(R)$ that is obtained on the basis of a difference value between a peak wavelength CR of red light R of the R light source 20d and the peak wavelength of the reference light source. It is preferable that the spectral characteristics of each individual light source device 14 are measured and parameterized at the time of shipment from the factory with regard to the first correction parameters.

Figure 4:
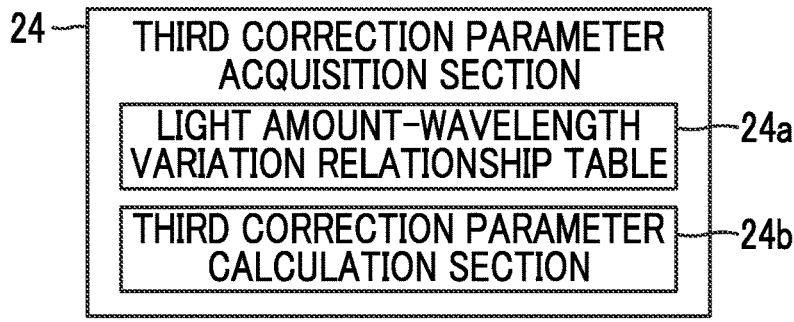
FIG. 4 is a block diagram showing the functions of a third correction parameter acquisition section.

Further, the light source device 14 is provided with a third correction parameter acquisition section 24 (see FIG. 2) that acquires third correction parameters to be used in the calibration mode. The third correction parameter is a parameter related to a difference in a specific spectral image (a spectral image for the calculation of oxygen saturation) based on a change in the wavelength characteristics (mainly, wavelength variation) of each illumination light caused by a change in the amount of light emitted from each of the BS light source 20a, the BL light source 20b, the G light source 20c, and the R light source 20d. As shown in FIG. 4, the third correction parameter acquisition section 24 comprises a light amount-wavelength variation relationship table 24a and a third correction parameter calculation section 24b in order to acquire the third correction parameters. In the light source device 14, programs related to various types of processing are incorporated into a program memory. The programs incorporated into the program memory are executed by a central controller (not shown) for a light source formed of a light source processor, so that the functions of the third correction parameter acquisition section are realized.

Figure 5:
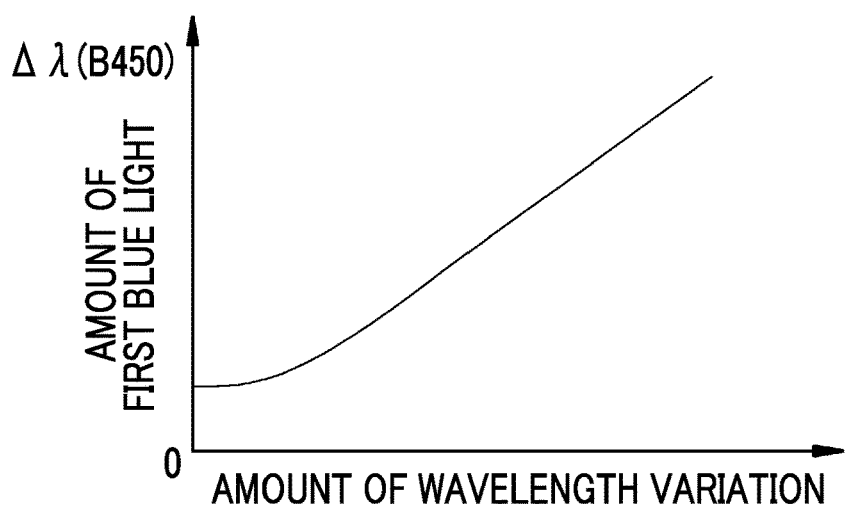
FIG. 5 is a graph showing a relationship between first blue light and the amount of wavelength variation.

A relationship between the amount of each illumination light and the wavelength variation of each illumination light is stored in the light amount-wavelength variation relationship table 24a. A table for each of the BS light source 20a, the BL light source 20b, the G light source 20c, and the R light source 20d is provided in the light amount-wavelength variation relationship table 24a. For example, as shown in FIG. 5, a relationship between the amount LMBS of first blue light BS and the amount $\Delta\lambda(B450)$ of wavelength variation (for example, the amount of central wavelength variation) of first blue light BS, which is caused by a change in the amount of first blue light BS, is stored in the light amount-wavelength variation relationship table 24a to be used for the BS light source 20a. In a case where the amount of first blue light BS is relatively large, a relationship between the amount of first blue light BS and the amount $\Delta\lambda$ of wavelength variation is linear. However, in a case where the amount of first blue light BS is relatively small, a relationship between the amount of first blue light BS and the amount $\Delta\lambda$ of wavelength variation is non-linear.

In a case where the amount of light emitted from the light source unit 20 is changed, the third correction parameter calculation section 24b specifies the amount W. of wavelength variation with reference to the light amount-wavelength variation relationship table 24a corresponding to a light source from which the amount of light emitted is changed. Then, the third correction parameter calculation section 24b calculates third correction parameters corresponding to the amount $\Delta\lambda$ of wavelength variation on the basis of a predetermined relationship between the amount $\Delta\lambda$ of wavelength variation and the third correction parameters. The third correction parameters include four parameters, that is, a third correction parameter $\Delta3(B450)$ for the wavelength variation of the BS light source 20a, a third correction parameter $\Delta3(B470)$ for the wavelength variation of the BL light source 20b, a third correction parameter $\Delta3(G)$ for the wavelength variation of the G light source 20c, and a third correction parameter $\Delta3(R)$ for the wavelength variation of the R light source 20d.

The light source controller 22 independently controls the timings of the turning on or off of the respective light sources 20a to 20d of the light source unit 20, the amounts of light emitted at the times of turning on, and the like. Due to the control of the light source controller 22, the light source unit 20 emits illumination light for normal observation to be used in the normal mode and illumination light for oxygen saturation observation to be used in the oxygen saturation observation mode.

In the case of the normal mode, the light source controller 22 simultaneously turns on the BS light source 20a, the G light source 20c, and the R light source 20d. For this reason, illumination light for normal observation is white light that includes first blue light BS, green light G, and red light R. In this embodiment, in the case of the normal mode, the light source unit 20 constantly emits the white light but may emit the white light at an image pickup timing (hereinafter, referred to as an image pickup frame) of the object to be observed.

Figure 6:
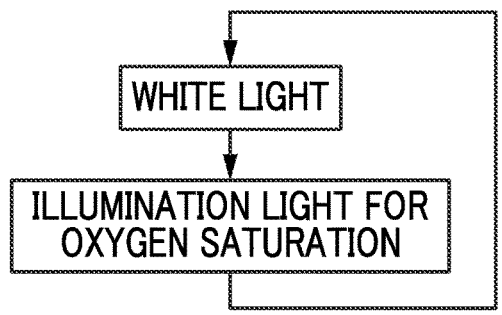
FIG. 6 is a diagram illustrating a light emission pattern in an oxygen saturation observation mode of a first embodiment.

In the case of the oxygen saturation observation mode or the calibration mode, the light source controller 22 alternately and repeatedly turns on or off the respective light sources 20a to 20d in a first pattern and a second pattern. The first pattern is a pattern in which the BS light source 20a, the G light source 20c, and the R light source 20d are simultaneously turned on. In the case of the first pattern, white light including first blue light BS, green light Q and red light R is emitted as illumination light. On the other hand, the second pattern is a pattern in which the BL light source 20b, the G light source 20c, and the R light source 20d are simultaneously turned on. For this reason, illumination light for oxygen saturation observation including second blue light BL, green light Q and red light R is emitted in the case of the second pattern. In the oxygen saturation observation mode, as shown in FIG. 6, white light and illumination light for oxygen saturation observation are alternately and repeatedly emitted for, for example, each image pickup frame in accordance with an image pickup frame.

As shown in FIG. 2, illumination light emitted from the light source unit 20 is incident on a light guide 41. The light guide 41 is built in the endoscope 12 and a universal cord (a cord connecting the endoscope 12 to the light source device 14 and the processor device 16), and transmits illumination light to the distal end part 12d of the endoscope 12. A multimode fiber can be used as the light guide 41. For example, a thin fiber cable of which a total diameter of a core diameter of 105 μm, a cladding diameter of 125 μm, and a protective layer forming a covering is in the range of φ 0.3 to 0.5 mm can be used.

The distal end part 12d of the endoscope 12 is provided with an illumination optical system 30a and an image pickup optical system 30b. The illumination optical system 30a includes an illumination lens 45, and the object to be observed is irradiated with illumination light through the illumination lens 45. The image pickup optical system 30b includes an objective lens 46, a zoom lens 47, and an image sensor 48. The image sensor 48 picks up the image of the object to be observed using the reflected light and the like (including scattered light, fluorescence emitted from the object to be observed, fluorescence caused by a medicine given to the object to be observed, or the like) of illumination light returning from the object to be observed through the objective lens 46 and the zoom lens 47. The zoom lens 47 is moved by the operation of the zoom operation part 13c and increases or reduces the size of the object to be observed of which the image is to be picked up by the image sensor 48.

Figure 7:
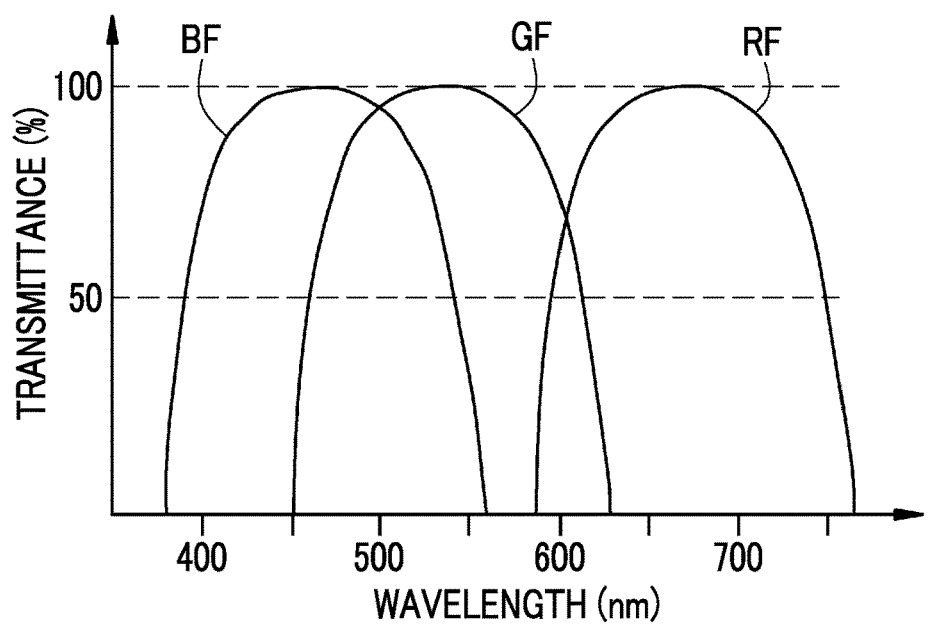
FIG. 7 is a graph showing the spectral characteristics of color filters.

The image sensor 48 is a primary color sensor, and comprises three types of pixels, that is, B pixels (blue pixel) including blue color filters, G pixels (green pixels) including green color filters, and R pixels (red pixels) including red color filters. As shown in FIG. 7, the blue color filter mainly transmits light of a blue light wavelength range, specifically, light of which the wavelength range is in the range of 380 to 560 nm. The transmittance of the blue color filter BF has a peak near a wavelength of 460 to 470 nm. The green color filter GF mainly transmits light of a green light wavelength range, specifically, light of which the wavelength range is in the range of 460 to 470 nm. The red color filter RF mainly transmits light of a red light wavelength range, specifically, light of which the wavelength range is in the range of 580 to 760 nm.

In a case where the image of the object to be observed is picked up by the image sensor 48, three types of spectral images, that is, a B image (blue image) obtained from the image pickup in the B pixel, a G image (green image) obtained from the image pickup in the G pixel, and an R image (red image) obtained from the image pickup in the R pixel can be obtained at the maximum in a single image pickup. Since illumination light for normal observation to be used is white light in the case of the normal mode, Bc images, Gc images, and Rc images are obtained. The Bc image is an image that is obtained from the image pickup of the object to be observed mainly using the reflected light and the like of first blue light BS, and the Gc image is an image that is obtained from the image pickup of the object to be observed mainly using the reflected light and the like of green light G. Likewise, the Rc image is an image that is obtained from the image pickup of the object to be observed mainly using the reflected light and the like of red light R.

On the other hand, in the oxygen saturation observation mode or the calibration mode, B1 images, G1 images, and R1 images are acquired as spectral images in a frame where white light is emitted, and B2 images, G2 images, and R2 images are acquired as spectral images in a frame where illumination light for oxygen saturation observation is emitted. The B1 image, the G1 image, and the R1 image are the same as the Bc image, the Gc image, and the Rc image. The B2 image is an image that is obtained from the image pickup of the object to be observed mainly using the reflected light and the like of second blue light BL. The G2 image is an image that is obtained from the image pickup of the object to be observed mainly using the reflected light and the like of green light G. Likewise, the R2 image is an image that is obtained from the image pickup of the object to be observed mainly using the reflected light and the like of red light R.

A charge coupled device (CCD) sensor or a complementary metal oxide semiconductor (CMOS) sensor can be used as the image sensor 48. Further, the image sensor 48 of this embodiment is a primary color sensor, but a complementary color sensor can also be used as the image sensor 48. The complementary color sensor includes, for example, cyan pixels provided with cyan color filters, magenta pixels provided with magenta color filters, yellow pixels provided with yellow color filters, and green pixels provided with green color filters. In a case where the complementary color sensor is used, images obtained from the respective color pixels described above can be converted into the B image, the G image, and the R image by complementary color-primary color conversion. Further, a monochrome sensor not provided with color filters can be used as the image sensor 48 instead of the color sensor. In this case, the images having the respective colors can be obtained from the sequential image pickup of the object to be observed using illumination light having the respective colors, such as B, G, and R.

As shown in FIG. 2, the processor device 16 includes a general controller 52, an image acquisition unit 54, an image processing unit 61, a static image storage controller 64, a static image storage unit 65, and a display controller 66.

The general controller 52 controls each unit provided in the processor device 16. The general controller 52 performs a control corresponding to each mode on the basis of a mode changeover signal output from the mode changeover switch 13a. Further, the general controller 52 controls the endoscope 12 and the light source device 14. The general controller 52 controls the irradiation timing of illumination light by controlling the light source controller 22 of the light source device 14. Furthermore, the general controller 52 controls an image pickup timing by controlling the image sensor 48 of the endoscope 12.

In the processor device 16, programs related to various types of processing are incorporated into the program memory. The programs incorporated into the program memory are executed by the general controller 52 formed of an image control processor, so that the functions of the image acquisition unit 54, the image processing unit 61, the static image storage controller 64, the static image storage unit 65, and the display controller 66 are realized.

The image acquisition unit 54 acquires the image of the object to be observed from the image sensor 48. In the case of the normal mode, the image acquisition unit 54 acquires Bc images, Gc images, and Rc images for each image pickup frame. In the case of the oxygen saturation observation mode or the calibration mode, the image acquisition unit 54 acquires B1 images, G1 images, and R1 images in an image pickup frame where white light is used as illumination light and acquires B2 images, G2 images, and R2 images in an image pickup frame where illumination light for oxygen saturation observation is used as illumination light.

Further, the image acquisition unit 54 includes a digital signal processor (DSP) 56, a noise-reduction section 58, and a conversion section 59, and performs various types of processing on the acquired images using these.

The DSP 56 performs various types of processing, such as defect correction processing, offset processing, gain correction processing, matrix processing, gamma conversion processing, demosaicing processing, and YC conversion processing, on the acquired images as necessary.

The defect correction processing is processing for correcting the pixel values of pixels corresponding to defective pixels of the image sensor 48. The offset processing is processing for reducing dark current components from the images subjected to the defect correction processing and setting an accurate zero level. The gain correction processing is processing for multiplying the images, which have been subjected to the offset processing, by gains to adjust the signal level of each image. The matrix processing is processing for improving the color reproducibility of the images subjected to the offset processing, and the gamma conversion processing is processing for adjusting the brightness and chroma saturation of the images subjected to the matrix processing. The demosaicing processing (also referred to as equalization processing or demosaicing) is processing for interpolating the pixel values of missing pixels, and is performed on the images subjected to the gamma conversion processing. The missing pixels are pixels that do not have pixel values since other color pixels are arranged in the image sensor 48 due to the arrangement of color filters. For example, since the B image is an image obtained from the image pickup of the object to be observed in the B pixel, pixels arranged at the positions of the G pixel and the R pixel of the image sensor 48 do not have pixel values. In the demosaicing processing, the B image is interpolated to generate the pixel values of pixels arranged at the positions of the G pixel and the R pixel of the image sensor 48. The YC conversion processing is processing for converting images, which have been subjected to the demosaicing processing, into luminance channel Y, color difference channels Cb, and color difference channels Cr.

The noise-reduction section 58 performs noise-reduction processing on the luminance channel Y, the color difference channels Cb, and the color difference channels Cr, using, for example, a moving average method, a median filtering method, or the like. The conversion section 59 converts the luminance channel Y, the color difference channels Cb. and the color difference channels Cr, which have been subjected to the noise-reduction processing, into images having the respective colors of B, Q and R, again.

The image processing unit 61 includes a normal processing section 62, a special processing section 63, and a calibration processing section 68. The normal processing section 62 operates in the normal mode; performs color conversion processing, color enhancement processing, and structure enhancement processing on the Bc images, the Gc images, and Rc images for one image pickup frame, which have been subjected to the above-mentioned various types of processing; and generates normal images. In the color conversion processing, 3×3-matrix processing, gradation transformation processing, and three-dimensional look up table (LUT) processing, and the like are performed on the images having the respective colors of B, G and R. The color enhancement processing is processing for enhancing the color of an image, and the structure enhancement processing is processing for enhancing, for example, the tissue or structure of the object to be observed, such as blood vessels or a pit pattern. The display controller 66 sequentially acquires normal images from the normal processing section 62, converts the acquired normal images into a format that is suitable to be displayed, and sequentially outputs and displays the converted normal images on the monitor 18. Accordingly, in the case of the normal mode, a medical doctor or the like can observe the object to be observed using the video of the normal images.

The special processing section 63 operates in the oxygen saturation observation mode, and calculates oxygen saturation on the basis of the first correction parameters and white balance correction data, which are acquired in the calibration mode, in addition to the B1 images, the G1 images, the R1 images, and the B2 images that are specific spectral images required for the calculation of oxygen saturation. Further, the special processing section 63 creates an oxygen saturation image subjected to coloring processing or the like according to the calculated oxygen saturation.

Figure 8:
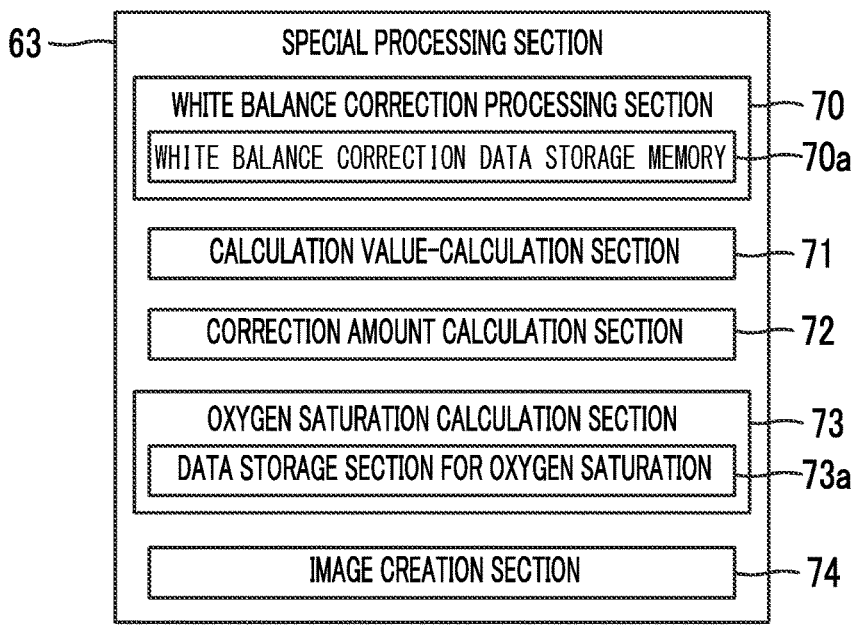
FIG. 8 is a block diagram showing the functions of a special processing section of the first embodiment.

As shown in FIG. 8, the special processing section 63 comprises a white balance correction processing section 70, a calculation value-calculation section 71, a correction amount calculation section 72, an oxygen saturation calculation section 73, and an image creation section 74. The white balance correction processing section 70 performs white balance correction processing on the B1 images, the G1 images, the R1 images, and the B2 images, which are specific spectral images, using the white balance correction data stored in a white balance correction data storage memory 70a. The white balance correction data are data that are obtained from the image pickup of a reference white plate WP and are used to correct a difference in a white portion of a spectral image caused by a combination of the endoscope 12 and the light source device 14. The white balance correction data include white balance correction data NB1 for B1 image, white balance correction data NG1 for G1 image, white balance correction data NR1 for R1 image, and white balance correction data NB2 for B2 image.

The B1 image is divided by the white balance correction data NB1 for B1 image in the white balance correction processing section 70, so that a B1 image subjected to white balance correction (B1*=B1/NB1) is obtained. Likewise, the G1 image is divided by the white balance correction data NG1 for G1 image, so that a G1 image subjected to white balance correction (G1*=G1/NG1) is obtained. Further, the R1 image is divided by the white balance correction data NR1 for R1 image, so that an R1 image subjected to white balance correction (R1*=R1/NR1) is obtained. Furthermore, the B2 image is divided by the white balance correction data NB2 for B2 image, so that a B2 image subjected to white balance correction (B2*=B2/NB2) is obtained.

In order to correct a difference in the specific spectral image based on the wavelength variation of each semiconductor light source of the light source unit 20, it is preferable that the B1 image, the G1 image, the R1 image, and the B2 image subjected to white balance correction (B*, G1*, R1*, and B2) are further corrected in the white balance correction processing section 70 using the third correction parameters $\Delta 3$(B450), $\Delta 3$(B470), $\Delta 3$(G), and $\Delta 3$(R).

Specifically, it is preferable that the B1 image subjected to white balance correction is multiplied by a correction coefficient $\alpha$(B1) for B1 image based on the third correction parameters $\Delta 3$(B450), $\Delta 3$(B470), $\Delta 3$(G), and $\Delta 3$(R) (B1*× $\alpha$(B1)). Likewise, it is preferable that the G1 image subjected to white balance correction is multiplied by a correction coefficient $\alpha$(G1) for G1 image based on the third correction parameters $\Delta 3$(B450), $\Delta 3$(B470), $\Delta 3$(G), and $\Delta 3$(R) (G1*×$\alpha$(G1)). Further, it is preferable that the R1 image subjected to white balance correction is multiplied by a correction coefficient $\alpha$(R1) for R1 image based on the third correction parameters $\Delta 3$(B450), $\Delta 3$(B470), $\Delta 3$(G), and $\Delta 3$(R) (R1*×$\alpha$(R1)). Furthermore, it is preferable that the B2 image subjected to white balance correction is multiplied by a correction coefficient (B2) for B2 image based on the third correction parameters $\Delta 3$(B450), $\Delta 3$(B470), $\Delta 3$(G), and $\Delta 3$(R) (B2*×$\alpha$(B2)).

The calculation value-calculation section 71 calculates calculation values for the calculation of oxygen saturation by calculation processing based on the B1 image, the G1 image, the R1 image, and the B2 image (B1*, G1*, R1*, and B2* or B1*×$\alpha$(B1), G1*×$\alpha$(G1), R1*×$\alpha$(R1), and B2*×$\alpha$(B2)) that are the specific spectral images subjected to white balance correction. Specifically, the calculation value-calculation section 71 calculates a signal ratio X (=ln(R1*/G1*)) as the calculation value by performing calculation, which logarithmizes the R1 image subjected to white balance correction by dividing the R1 image subjected to white balance correction by the G1 image subjected to white balance correction, as the calculation processing. Further, the calculation value-calculation section 71 calculates a signal ratio Y (=ln(B2*/G1*)) as the calculation value by performing calculation, which logarithmizes the B2 image subjected to white balance correction by dividing the B2 image subjected to white balance correction by the G1 image subjected to w % bite balance correction, as the calculation processing.

The correction amount calculation section 72 calculates correction amounts, which are used to correct the signal ratios X and Y, on the basis of the signal ratios X and Y, which are calculation values, and the first correction parameters. The reason to correct the signal ratios X and Y even though white balance correction processing is performed as described above is as follows. A first signal ratio and a second signal ratio show the same value ("0") in a white portion due to white balance correction processing regardless of a combination of the endoscope 12 and the light source device 14, but are not corrected in color portions other than the white portion. In a case where the first signal ratio and the second signal ratio are not corrected in other color portions, it is difficult to accurately calculate oxygen saturation.

Accordingly, the correction amount calculation section 72 acquires first correction parameters $\Delta 1$(B450), $\Delta 1$(B470), $\Delta 1$(G), and $\Delta 1$(R), which are used to correct differences in the spectral characteristics of the respective semiconductor light sources of the light source unit 20, from the light source device 14 and calculates the correction amounts $\Delta X$ and $\Delta Y$ of the signal ratios X and Y using these first correction parameters $\Delta 1$(B450), $\Delta 1$(B470), $\Delta 1$(G), and $\Delta 1$(R). Specifically, the correction amount calculation section 72 calculates the correction amounts $\Delta X$ and $\Delta Y$ according to the following equation (1).

$$\Delta X = M11 \times X + M12 \times Y$$

$$\Delta Y = M21 \times X + M22 \times Y \qquad \text{Equation (1)}$$

Here, M_ij is a matrix coefficient and "M_ij=b450_ij×$\Delta 1$(B450)+b470_ij×$\Delta 1$(B470)+g_ij×$\Delta 1$(G)+r_ij$\Delta 1$(R)" is satisfied. b450_ij, b470_ij, g_ij, and r_ij are arbitrary coefficients. "i" of subindices is 1 or 2 and "j" of subindices is 1 or 2.

The oxygen saturation calculation section 73 corrects the signal ratios X and Y using the correction amounts $\Delta X$ and $\Delta Y$ and calculates oxygen saturation on the basis of the corrected signal ratios X* and Y*. Specifically, the oxygen saturation calculation section 73 calculates the corrected signal ratios X* and Y* by the following equation (2).

$$X^* = X + \Delta X$$

$$Y^* = Y + \Delta Y \qquad \text{Equation (2)}$$

Figure 9:
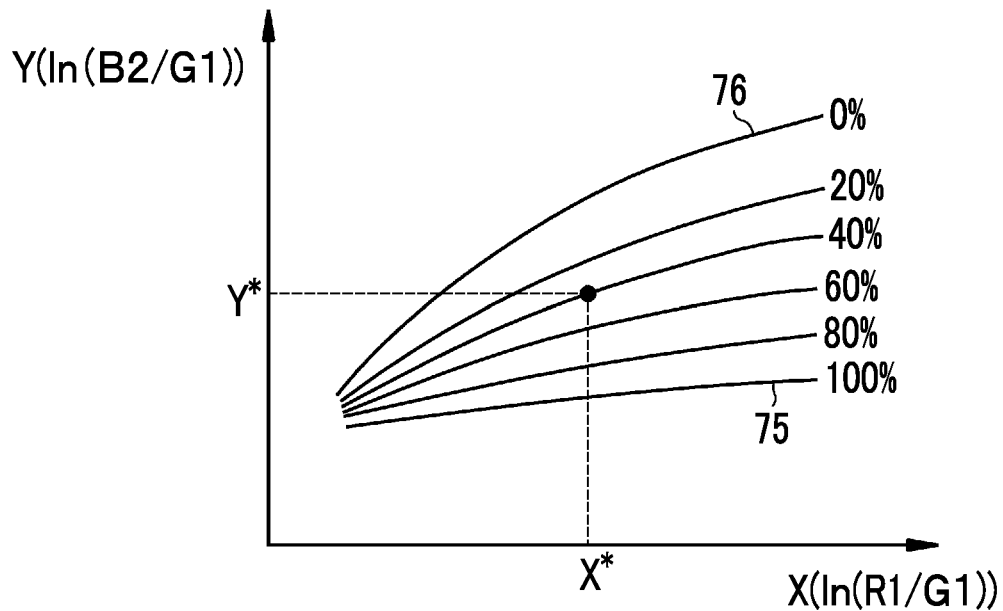
FIG. 9 is a diagram showing a relationship between oxygen saturation and signal ratios X and Y.

The oxygen saturation calculation section 73 calculates oxygen saturation corresponding to the corrected X* and Y* for each pixel with reference to a data storage section 73a for oxygen saturation in which a correlation between the signal ratios X and Y and oxygen saturation is stored. With regard to the correlation stored in the data storage section 73a for oxygen saturation, isolines, which connect points where oxygen saturation has the same value, are formed in a substantially horizontal direction as shown in FIG. 9 in a feature space of which the vertical axis represents the signal ratio Y and the horizontal axis represents the signal ratio X. Further, the isoline is positioned on the lower side in the direction of the vertical axis as oxygen saturation is larger. For example, an isoline 75 on which oxygen saturation is 100% is positioned below an isoline 76 on which oxygen saturation is 0%.

For example, referring to the correlation stored in the data storage section 73a for oxygen saturation, oxygen saturation corresponding to the corrected signal ratios X* and Y* is "40%". Accordingly, the oxygen saturation calculation section 70 calculates the oxygen saturation of a pixel corresponding to the corrected signal ratios X* and Y* as "40%".

The image creation section 74 creates an oxygen saturation image using oxygen saturation. Specifically, the image creation section 74 creates a normal image on the basis of the B1 image, the G1 image, and the R1 image and changes the color tone of the normal image according to oxygen saturation. For example, it is preferable that the image creation section 74 does not change the color tone of a pixel of the normal image where oxygen saturation exceeds 70% and displays the pixel as it is, but changes the color tone of a pixel of the normal image where oxygen saturation is 70% or less and displays the pixel. In a case where a color tone is to be changed, it is preferable that the color tone is closer to a cold color (for example, blue) as oxygen saturation is lower. The image creation section 74 may create an oxygen saturation image using oxygen saturation and a specific color image without creating a normal image. In this case, it is preferable that the image creation section 74 creates an oxygen saturation image using the luminance channel Y and the color difference channels Cr and Cb. For example, it is preferable that the luminance channel Y is assigned to G1 image signals and the color difference channels Cr and Cb are assigned according to oxygen saturation.

Figure 10:
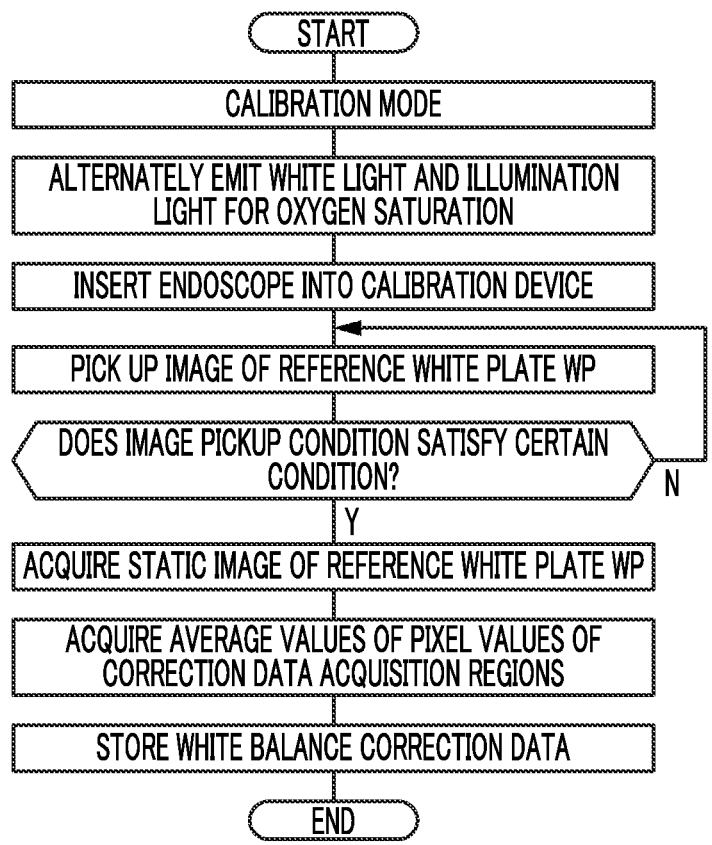
FIG. 10 is a flowchart showing the flow of a calibration mode.
Figure 11:
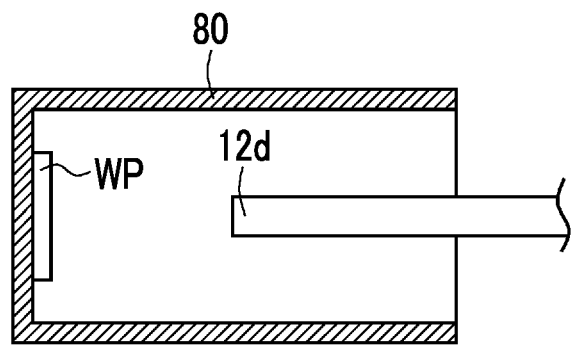
FIG. 11 is a diagram illustrating a calibration device.

A series of flows of the calibration mode in which white balance correction data are acquired will be described with reference to a flowchart shown in FIG. 10. The calibration mode is executed at a facility (a hospital or the like) where the endoscope system 10 is installed. First, the endoscope system 10 is switched to the calibration mode by the operation of the mode changeover switch 3a of the endoscope 12. In a case where the endoscope system 10 is switched to the calibration mode, white light and illumination light for oxygen saturation observation are emitted alternately. Then, the endoscope 12 is inserted into the calibration device 80 including the reference white plate WP as shown in FIG. 11. The image of the reference white plate WP is picked up in a state where the distal end part 12d of the endoscope faces the reference white plate WP. In a case where the image pickup state of the reference white plate WP satisfies a certain condition, the static images of the reference white plate WP are acquired automatically or manually (by the operation of the freeze switch 13b). The static images of the reference white plate WP are transmitted to the calibration processing section 68.

Figure 12:
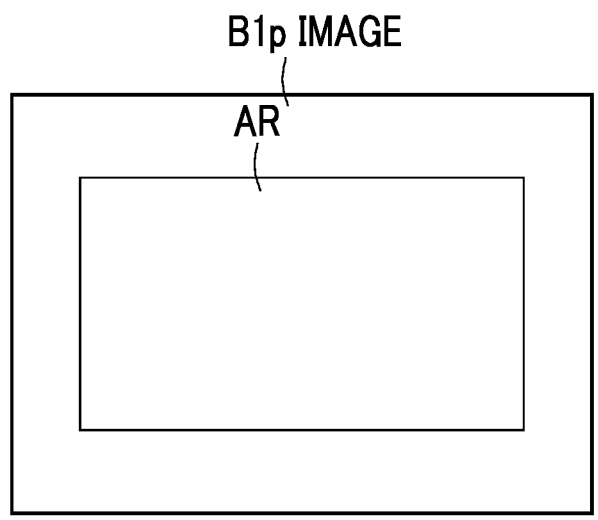
FIG. 12 is a diagram illustrating a correction data acquisition region AR.

The static images of the reference white plate WP include a B1p image, a G1p image, and an R1p image that are the spectral images of white light and a B2p image, a G2p image, and an R2p image that are the spectral images of illumination light for oxygen saturation observation. The calibration processing section 68 sets a rectangular correction data acquisition region AR shown in FIG. 12 in each of the B1p image, the G1p image, the R1p image, and the B2p image among the static images of the reference white plate WP, and calculates average values of the pixel values of the correction data acquisition regions AR. The average values of the pixel values of the correction data acquisition regions AR of the B1p image, the G1p image, the R1p image, and the B2p image are defined as the white balance correction data NB1, NG1, NR1, and NB2. The white balance correction data are stored in the white balance correction data storage memory 70a. The shape of the correction data acquisition region AR may be a circular shape in addition to a rectangular shape.

Figure 13:
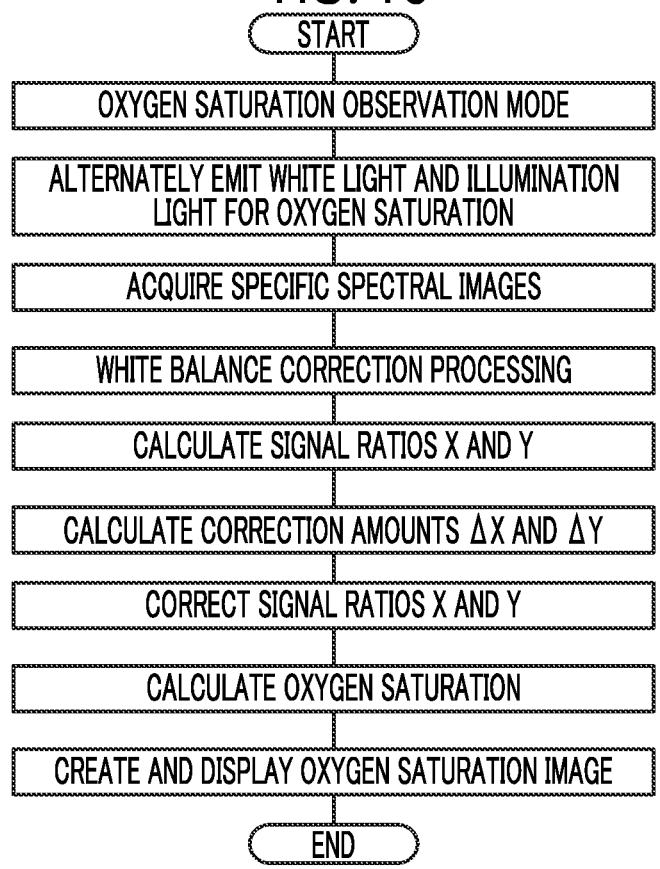
FIG. 13 is a flowchart showing the flow of an oxygen saturation observation mode.

Next, a series of flows of the oxygen saturation observation mode will be described with reference to a flowchart shown in FIG. 13. The endoscope system 10 is switched to the oxygen saturation observation mode by the operation of the mode changeover switch 13a of the endoscope 12. In a case where the endoscope system 10 is switched to the oxygen saturation observation mode, white light and illumination light for oxygen saturation observation are emitted alternately. The B1 image, the G1 image, and the R1 image are acquired in the case of the image pickup frame of white light. The B2 image, the G2 image, and the R2 image are acquired in the image pickup frame of illumination light for oxygen saturation observation. The B1 image, the G1 image, the R1 image, and the B2 image serve as specific spectral images to be used for the calculation of oxygen saturation.

The white balance correction processing section 70 performs white balance correction processing on the B1 image, the G1 image, the R1 image, and the B2 image that are specific spectral images. Accordingly, the B1 image, the G1 image, the R1 image, and the B2 image subjected to white balance correction are acquired. Next, the calculation value-calculation section 71 calculates the signal ratios X and Y as calculation values for the calculation of oxygen saturation by calculation processing based on the B1 image, the G1 image, the R1 image, and the B2 image subjected to white balance correction.

The correction amount calculation section 72 calculates correction amounts $\Delta X$ and $\Delta Y$, which are used to correct the signal ratios X and Y, on the basis of the signal ratios X and Y and the first correction parameters that are used to correct differences in the spectral characteristics of the respective semiconductor light sources of the light source unit 20. The oxygen saturation calculation section 73 corrects the signal ratios X and Y using the correction amounts $\Delta X$ and $\Delta Y$ and calculates oxygen saturation on the basis of the corrected signal ratios $X^*$ and $Y^*$. The image creation section 74 creates an oxygen saturation image using the calculated oxygen saturation. The created oxygen saturation image is displayed on the monitor 18.

Second Embodiment

Figure 14:
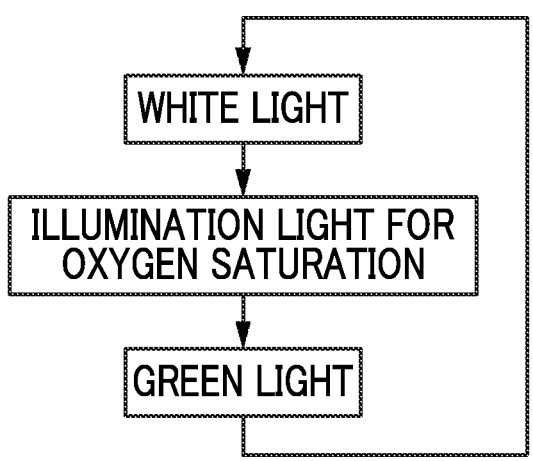
FIG. 14 is a diagram illustrating a light emission pattern in an oxygen saturation observation mode of a second embodiment.
Figure 15:
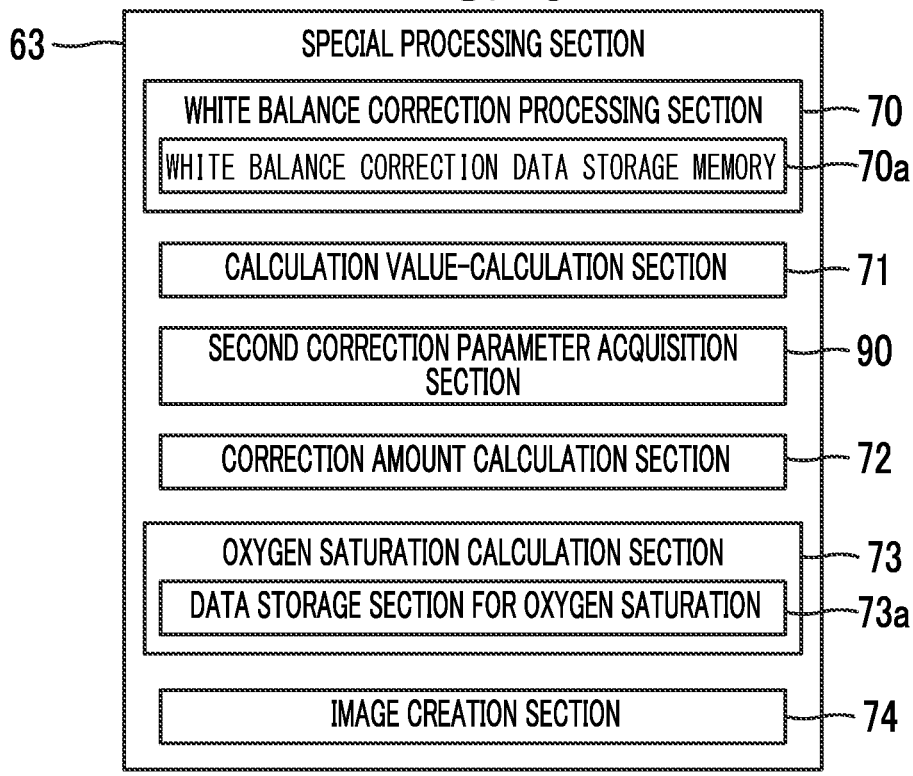
FIG. 15 is a block diagram showing the functions of a special processing section of the second embodiment.

In a second embodiment, correction amounts of the signal ratios X and Y are calculated using second correction parameters, which are used to correct differences in calculation values caused by combinations of the respective semiconductor light sources of the light source unit 20 and the endoscope 12, in addition to the first correction parameters. In an oxygen saturation observation mode of the second embodiment, specific illumination light to be used to acquire the second correction parameters is emitted in addition to white light and illumination light for oxygen saturation observation. For example, it is preferable that green light G emitted from the green light source 20c is used as the specific illumination light. In this case, it is preferable that white light, illumination light for oxygen saturation observation, and green light are alternately emitted as shown in FIG. 14. B3 images, G3 images, and R3 images are obtained in the image pickup frame of green light as spectral images. The B3 images, the G3 images, and the R3 images may be subjected to white balance correction processing. Further, the correction amounts may be calculated on the basis of the first correction parameters, the second correction parameters, and the third correction parameters. Furthermore, the correction amounts may be calculated on the basis of at least one of the first correction parameters, the second correction parameters, or the third correction parameters.

Figure 16:
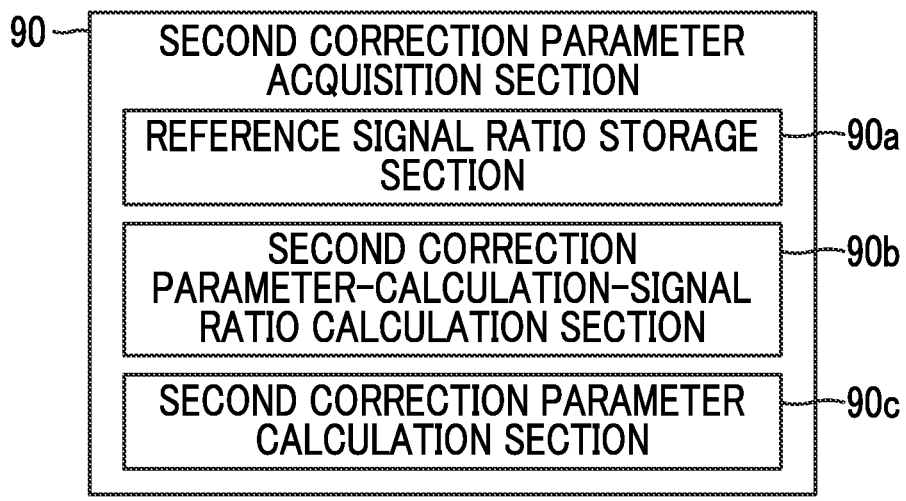
FIG. 16 is a block diagram showing the functions of a second correction parameter acquisition section.

A special processing section 63 of the second embodiment is provided with a second correction parameter acquisition section 90 that acquires the second correction parameters. As shown in FIG. 16, the second correction parameter acquisition section 90 comprises a reference signal ratio storage section 90a that stores reference signal ratios Xs and Ys related to signal ratios X and Y, and the like in advance, a second correction parameter-calculation-signal ratio calculation section 90b, and a second correction parameter calculation section 90c that calculates the second correction parameters.

The reference signal ratio storage section 90a includes a reference signal ratio Z1s related to a signal ratio Z1 (=B1/G1) that is obtained in a case where the B1 image is divided by the G1 image, a reference signal ratio Z2s related to a signal ratio Z2 (=B3/G1) that is obtained in a case where the B3 image is divided by the G1 image, a reference signal ratio Z3s related to a signal ratio Z3 (=G3/G1) that is obtained in a case where the G3 image is divided by the G1 image, a reference signal ratio Z4s related to a signal ratio Z4 (=G2/G1) that is obtained in a case where the G2 image is divided by the G1 image, and a reference signal ratio Z5s related to a signal ratio Z5 (=R3/G1) that is obtained in a case where the R3 image is divided by the G1 image, in addition to the reference signal ratios Xs and Ys. The above-mentioned signal ratios Z1 to Z5 are signal ratios for the calculation of second correction parameters that are used for the calculation of the second correction parameters.

The second correction parameter-calculation-signal ratio calculation section 90b calculates the signal ratios for the calculation of second correction parameters. That is, the second correction parameter-calculation-signal ratio calculation section 90b calculates the signal ratio Z1 on the basis of the B1 image and the G1 image as the signal ratios for the calculation of second correction parameters. Likewise, the second correction parameter-calculation-signal ratio calculation section 90b calculates the signal ratio Z2 on the basis of the B3 image and the G1 image. Further, the second correction parameter-calculation-signal ratio calculation section 90b calculates the signal ratio Z3 on the basis of the G3 image and the G1 image. Furthermore, the second correction parameter-calculation-signal ratio calculation section 90b calculates the signal ratio Z4 on the basis of the G2 image and the G1 image. The second correction parameter-calculation-signal ratio calculation section 90b calculates the signal ratio Z5 on the basis of the R3 image and the G1 image.

The second correction parameter calculation section 90c calculates a second correction parameter $\Delta 2(X)$ by a difference between the signal ratio X and the reference signal ratio Xs. Likewise, the second correction parameter calculation section 90c calculates a second correction parameter $\Delta 2(Y)$ by a difference between the signal ratio Y and the reference signal ratio Ys. Further, the second correction parameter calculation section 90c calculates a second correction parameter $\Delta 2(Z1)$ by a difference between the signal ratio Z1 and the reference signal ratio Z1s. Furthermore, the second correction parameter calculation section 90c calculates a second correction parameter $\Delta 2(Z2)$ by a difference between the signal ratio Z2 and the reference signal ratio Z2s. Moreover, the second correction parameter calculation section 90c calculates a second correction parameter $\Delta 2(Z3)$ by a difference between the signal ratio Z3 and the reference signal ratio Z3s. Further, the second correction parameter calculation section 90c calculates a second correction parameter $\Delta 2(Z4)$ by a difference between the signal ratio Z4 and the reference signal ratio Z4s. Furthermore, the second correction parameter calculation section 90c calculates a second correction parameter $\Delta 2(Z5)$ by a difference between the signal ratio Z5 and the reference signal ratio Z5s.

A correction amount calculation section 72 of the second embodiment also calculates the correction amounts $\Delta X$ and $\Delta Y$ of the signal ratios X and Y by Equation (1) as in the first embodiment. However, a matrix coefficient M_ij of Equation (1) in the second embodiment is different from that in the first embodiment. The matrix coefficient M_ij of the second embodiment is as follows. As in the first embodiment, "i" of subindices is 1 or 2 and "j" of subindices is 1 or 2.

$$M\_ij = b450\_ij \times \Delta(B450) + b470\_ij \times \Delta 1(B470) + g\_ij \times \Delta 1(G) + r\_ij \Delta 1(R) + B1\_ij \times A2(Z1) + B2\_ij \Delta 2(Y) + B3\_ij \times \Delta 2(Z2) + G2\_ij \times \Delta 2(X) + G3\_ij \times \Delta 2(Z3) + R2\_ij \times \Delta 2(Z4) + R3\_ij - A2(Z5)$$

Here, B1, B2, B3, G2, R3, R2, and R3 are arbitrary coefficients.

In the above-mentioned embodiments, an example of an endoscope system for a lumen using the endoscope 12, which is a soft endoscope, has been described as the endoscope system according to the embodiment of the present invention. However, the endoscope system according to the embodiment of the present invention can also be applied to an endoscope system for an abdominal cavity that uses a surgical rigid endoscope.

The hardware structures of the processing units, which execute various types of processing in the above description, such as the first correction parameter storage memory 23, the third correction parameter acquisition section 24, the image acquisition unit 54, the image processing unit 61, the normal processing section 62, the special processing section 63, the static image storage controller 64, the static image storage unit 65, the display controller 66, the calibration processing section 68, the white balance correction processing section 70, the white balance correction data storage memory 70a, the calculation value-calculation section 71, the correction amount calculation section 72, the oxygen saturation calculation section 73, the data storage section 73a for oxygen saturation, the image creation section 74, the second correction parameter acquisition section 90, the reference signal ratio storage section 90a, the second correction parameter-calculation-signal ratio calculation section 90b, and the second correction parameter calculation section 90c, are various processors to be described below. The various processors include: a central processing unit (CPU) that is a general-purpose processor functioning as various processing units by executing software (program); a programmable logic device (PLD) that is a processor of which the circuit configuration can be changed after manufacture, such as a field programmable gate array (FPGA); a dedicated electrical circuit (graphical processing unit: GPU)) that is a processor having circuit configuration designed exclusively to perform various types of processing; and the like.

One processing unit may be formed of one of these various processors, or may be formed of a combination of two or more same type or different types of processors (for example, a plurality of FPGAs, a combination of a CPU and an FPGA, or a combination of GPU and CPU). Further, a plurality of processing units may be formed of one processor. As an example where a plurality of processing units are formed of one processor, first, there is an aspect where one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by a system-on-chip (SoC) or the like is used. In this way, various processing units are formed using one or more of the above-mentioned various processors as hardware structures.

In addition, the hardware structures of these various processors are more specifically electrical circuitry where circuit elements, such as semiconductor elements, are combined. Further, the hardware structure of the storage unit is a storage device, such as a hard disc drive (HDD) or a solid state drive (SSD).

EXPLANATION OF REFERENCES

10: endoscope system
12: endoscope
12a: insertion part
12b: operation part
12c: bendable part
12d: distal end part
12e: angle knob
13a: mode changeover switch
13b: freeze switch 13c: zoom operation part
14: light source device
16: processor device
18: monitor
19: user interface
20: light source unit
20a: BS light source
20b: BL light source
20c: G light source
20d: R light source
22: light source controller
23: first correction parameter storage memory
24: third correction parameter acquisition section
24a: light amount-wavelength variation relationship table
24b: third correction parameter calculation section
30a: illumination optical system
30b: image pickup optical system
41: light guide
45: illumination lens
46: objective lens
47: zoom lens
48: image sensor
52: general controller
54: image acquisition unit
56: DSP
58: noise-reduction section
59: conversion section
61: image processing unit
62: normal processing section
63: special processing section
64: static image storage controller
65: static image storage unit
66: display controller
68: calibration processing section
70: white balance correction processing section
70a: white balance correction data storage memory
71: calculation value-calculation section
72: correction amount calculation section
73: oxygen saturation calculation section
73a: data storage section for oxygen saturation
74: image creation section
75: isoline of 100%
76: isoline of 0%
80: calibration device
90: second correction parameter acquisition section
90a: reference signal ratio storage section
90b: second correction parameter-calculation-signal ratio calculation section
90c: second correction parameter calculation section
CBS: peak wavelength of first blue light
CBL: peak wavelength of second blue light
CG: peak wavelength of green light
CR: peak wavelength of red light
BF: blue color filter
GF: green color filter
RF: red color filter
WP: reference white plate
AR: correction data acquisition region

What is claimed is:

1. An endoscope system comprising:
a light source device including a plurality of semiconductor light sources that emit illumination light having a plurality of wavelength ranges;
an endoscope that is connected to the light source device and obtains a plurality of spectral images from image pickup of an object to be observed illuminated on the basis of the illumination light; and
an image control processor that is configured to:
calculate calculation values on the basis of specific spectral images, which are required for calculation of oxygen saturation of the object to be observed, among the spectral images; and
calculate the oxygen saturation of the object to be observed on the basis of a pre-stored correlation between the calculation values and the oxygen saturation,
wherein the light source device is configured to emit specific illumination light for acquisition of second correction parameters that are used to correct differences in the calculation values caused by combinations of optical characteristics of the light source device and optical characteristics of the endoscope, and
wherein the image control processor is further configured to:
calculate the second correction parameters on the basis of (i) a signal value of the specific spectral images obtained while the object to be observed is illuminated with the specific illumination light and (ii) a reference signal value stored in advance;
calculate a correction amount on the basis of the calculation values and the second correction parameters;
correct the calculation values on the basis of the correction amount; and
calculate the oxygen saturation of the object to be observed on the basis of the corrected calculation values and the correlation.

2. The endoscope system according to claim 1,
wherein the image control processor is further configured to:
acquire specific spectral images subjected to white balance correction by performing white balance correction processing, which is based on white balance correction data, on specific spectral images;
calculate calculation values for calculation of the oxygen saturation on the basis of the specific spectral images subjected to the white balance correction;
calculate correction amounts, which are used to correct the calculation values, by calculation processing based on the calculation values and the second correction parameters; and
calculate the oxygen saturation on the basis of the correlation and corrected calculation values that are obtained from correction of the calculation values using the correction amounts.

3. The endoscope system according to claim 2,
wherein the image control processor is further configured to:
acquire first correction parameters to be used to correct differences in spectral characteristics of the respective semiconductor light sources; and
calculate the correction amounts on the basis of the first correction parameters in addition to the calculation values and the second correction parameters in a case where the correction amounts are to be calculated.

4. The endoscope system according to claim 3,
wherein the plurality of semiconductor light sources are respectively controlled during an interval to cause a specific one of the illumination lights to be exclusively emitted by the corresponding one of the plurality of semiconductor light sources to acquire the second correction parameters.

5. The endoscope system according to claim 4,
wherein the specific illumination light is the green light emitted by the green semiconductor light source.

6. The endoscope system according to claim 2, further comprising:
a light source processor that is configured to acquire third correction parameters to be used to correct differences in the specific spectral images based on changes in wavelength characteristics of the illumination light caused by changes in amounts of light of the semiconductor light sources,
wherein the image control processor is further configured to calculate the correction amounts on the basis of the third correction parameters in addition to the calculation values and the second correction parameters.

7. The endoscope system according to claim 3,
wherein each of the first correction parameters is obtained on the basis of a difference value between a peak wavelength of each semiconductor light source and a peak wavelength of a reference light source.

8. The endoscope system according to claim 1,
wherein the plurality of semiconductor light sources include a BS light source that emits first blue light of which a central wavelength includes a wavelength of 450 nm, a BL light source that emits second blue light of which a central wavelength includes a wavelength of 470 nm, a green light source that emits green light, and a red light source that emits red light.

9. The endoscope system according to claim 8,
wherein the plurality of spectral images include a B1 image that corresponds to reflected light of first blue light of which a central wavelength includes a wavelength of 450 nm in a case where the BS light source is emitting, a B2 image that corresponds to reflected light of second blue light of which a central wavelength includes a wavelength of 470 nm in a case where the BL light source is emitting, a G1 image that corresponds to reflected green light in a case where the green light source is emitting, and an R1 image that corresponds to reflected red light in a case where the red light source is emitting.

10. A method of operating an endoscope system comprising a light source device that includes a plurality of semiconductor light sources emitting illumination light having a plurality of wavelength ranges, the method comprising:
causing an endoscope that is connected to the light source device to obtain a plurality of spectral images from image pickup of an object to be observed illuminated on the basis of the illumination light; and
causing a processor to
calculate calculation values on the basis of specific spectral images, which are required for calculation of oxygen saturation of the object to be observed, among the spectral images; and
calculate the oxygen saturation of the object to be observed on the basis of a pre-stored correlation between the calculation values and the oxygen saturation,
wherein specific illumination light is emitted by the light source device for acquisition of second correction parameters that are used to correct differences in the calculation values caused by combinations of optical characteristics of the light source device and optical characteristics of the endoscope, and
wherein the method further causes the processor to:
calculate the second correction parameters on the basis of (i) a signal value of the specific spectral images obtained while the object to be observed is illuminated with the specific illumination light and (ii) a reference signal value stored in advance;
calculate a correction amount on the basis of the calculation values and the second correction parameters;
correct the calculation values on the basis of the correction amount; and
calculate the oxygen saturation of the object to be observed on the basis of the corrected calculation values and the correlation.

* * * * *